Figure 1:
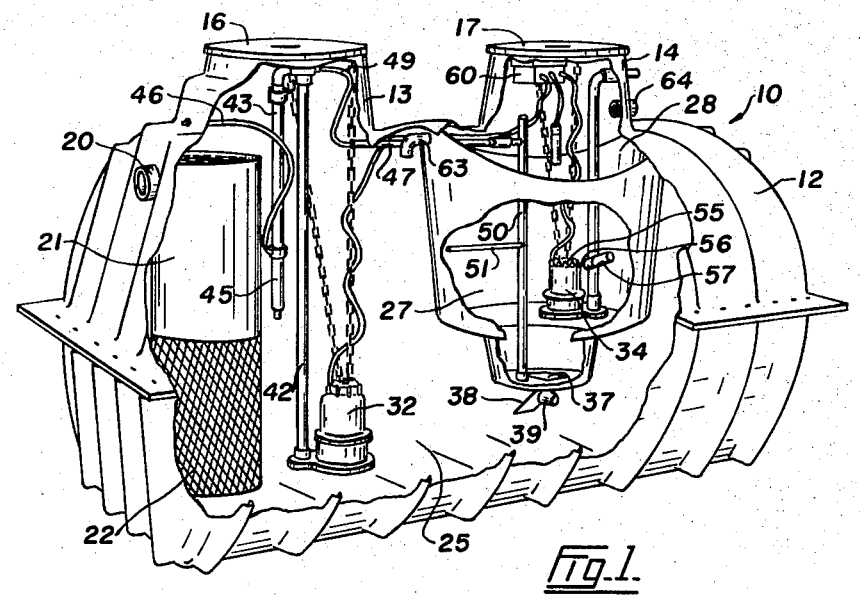

United States Patent [19]
Kelsey

[11] 3,834,536
[45] Sept. 10, 1974

[54] AEROBIC WASTEWATER TREATMENT APPARATUS

[75] Inventor: Harley E. Kelsey, North Vancouver, British Columbia, Canada

[73] Assignee: Northern Purification Services, Ltd., North Vancouver, British Columbia, Canada

[22] Filed: Oct. 10, 1973

[21] Appl. No.: 405,156

[52] U.S. Cl.................. 210/104, 210/152, 210/220
[51] Int. Cl............................................ B01d 21/24
[58] Field of Search .......... 210/104, 113, 114, 152, 210/220

[56] References Cited
UNITED STATES PATENTS

| | | | |
|---|---|---|---|
| 3,251,471 | 5/1966 | Allen | 210/220 X |
| 3,327,855 | 6/1967 | Watson et al. | 210/220 X |
| 3,476,682 | 11/1969 | Albers et al. | 210/220 X |
| 3,679,053 | 7/1972 | Koulouatos et al. | 210/104 X |
| 3,721,344 | 3/1973 | Kost | 210/104 |

Primary Examiner—John Adee
Attorney, Agent, or Firm—Fetherstonhaugh & Co.

[57] ABSTRACT

Apparatus for treating wastewater including a settling chamber within an aeration chamber, a valve-controlled outlet at the bottom of the settling chamber, a pump for directing liquid from the aeration chamber into the settling chamber, a pump in the settling chamber for directing supernatent liquid out of the apparatus, and control means for the pumps to operate said pumps sequentially to direct liquid from the aeration chamber into the settling chamber, and after a predetermined settling period, to pump supernatent liquid out of the latter chamber. The apparatus includes valve means at the bottom of the settling chamber operable to discharge sludge therefrom.

19 Claims, 7 Drawing Figures

AEROBIC WASTEWATER TREATMENT APPARATUS

This invention relates to apparatus for treating wastewater, such as sewage, drainage water and the like.

The migration of people and industry to areas beyond public sewers has resulted in the mass use of septic tanks. Lacking efficient equipment, little could be done to counteract the capacity of the soil to accept sewage wastes or the effect these wastes have on sub-surface ground water commonly used by home and community as "clean" drinking water. There are a great many septic tank and associated tile field failures. Foul smelling, germ laden sewage is often forced to the surface in and around inhabited areas, and well water contamination has resulted in many areas.

Septic tanks are anaerobic wastewater treatment systems, and in order to get away from the disadvantages of such systems, many conventional single home aerobic wastewater treatment systems have been designed to meet accepted criteria relative to load factors, retention times, aerates, and the like. However, load fluctuations are greater in these single homes units than in large sewage treatment systems, which means that close control and maintenance is necessary to ensure good treatment. As a result, many sanitary engineering agencies have discouraged the use of single home aerobic treatment systems.

The present wastewater treatment system provides the compartmentation, hydraulic flows, and oxygen necessary to optimize the aerobic process. In this apparatus, organic solids are entrapped and retained until necessary oxidation takes place even under extreme shock or overload conditions.

In the present treatment apparatus, compartmentation is accomplished by means of a comminution basket which provides a primary comminution chamber where gross incoming solids are broken up and partially oxidized, an aeration chamber, and an effluent settling chamber. The required air volume for the anaerobic process is delivered by an air injection nozzle. Continuous oxidation and aerobic decomposition of sewage solids becomes effective from extended aeration and recirculation of settled solids.

The working elements of this invention can be manufactured and sold for installation in large tanks, sewage ponds, and the like, or they can be incorporated into a tank to form a complete self-contained unit.

Aerobic wastewater treatment apparatus in accordance with the present invention comprises a settling chamber adapted to be placed in an aeration chamber, an outlet controlled by a valve at the bottom of the settling chamber for periodically directing sludge out of said settling chamber into the aeration chamber, first means for directing liquid from the aeration chamber into the settling chamber, second means for directing supernatent liquid from the settling chamber out of the apparatus, control means for the first directing means and the second directing means to direct liquid from the aeration chamber into the settling chamber, and after a predetermined settling period, to direct supernatent liquid out of the settling chamber, and means for causing said valve to open and close said outlet.

In particular, the present treatment apparatus comprises a settling chamber adapted to be placed in an aeration chamber, first means for directing liquid from the aeration chamber into the settling chamber, operating means for discharging sludge from the settling chamber into the aeration chamber, means for stopping said first directing means when the liquid in the settling chamber reaches a predetermined upper level, second means for directing supernatent liquid from the settling chamber out of the apparatus, control means for starting said second directing means after a predetermined settling period to direct the supernatent liquid out of the settling chamber and the apparatus, means for starting said first directing means when the liquid in said settling chamber drops to a lower predetermined level, and means for starting and stopping said operating means.

More specifically, this treatment apparatus comprises a settling chamber adapted to be placed in an aeration chamber, an outlet at the bottom of the settling chamber, a valve controlling said outlet, a first pump for directing liquid from the aeration chamber into the settling chamber, means for stopping the first pump when the liquid in the settling chamber reaches a predetermined upper level, a second pump in the settling chamber positioned to draw liquid from the latter chamber at a point spaced from the bottom thereof, control means for starting said second pump after a predetermined settling period to direct supernatent liquid out of the settling chamber and the apparatus, means for starting said first pump when the liquid in said settling chamber drops to a lower predetermined level, and means for opening and closing said valve when the level of the liquid in the settling chamber respectively rises above the level of the liquid in the aeration chamber and drops to or below said last-mentioned level.

An important feature in the preferred embodiment of this invention is that the valve for the settling chamber outlet, is a flap valve with a float attached thereto. This valve opens automatically under hydrostatic pressure when the liquid level in the settling chamber rises above that in the aeration chamber and the valve automatically closes when the settling chamber level drops to or below the level in the aeration chamber.

Figure 2:
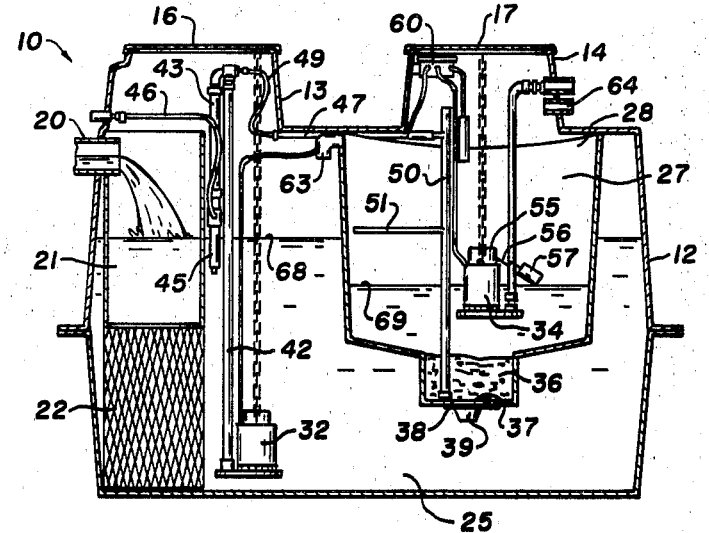
Figure 3:
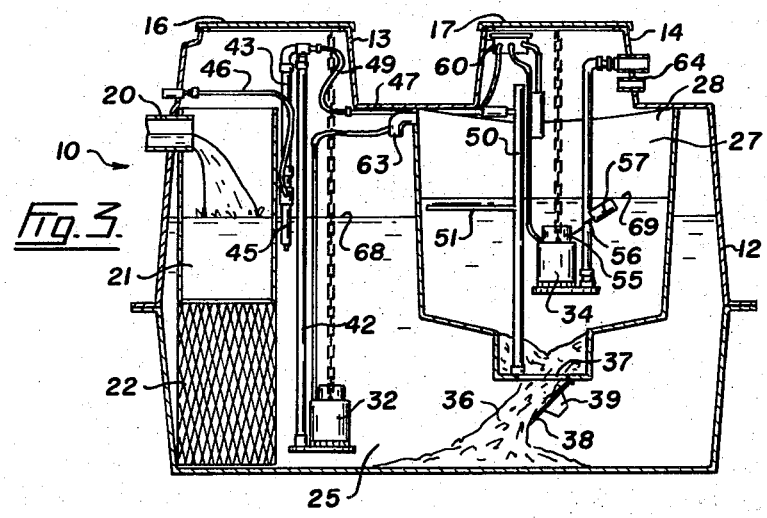
Figure 4:
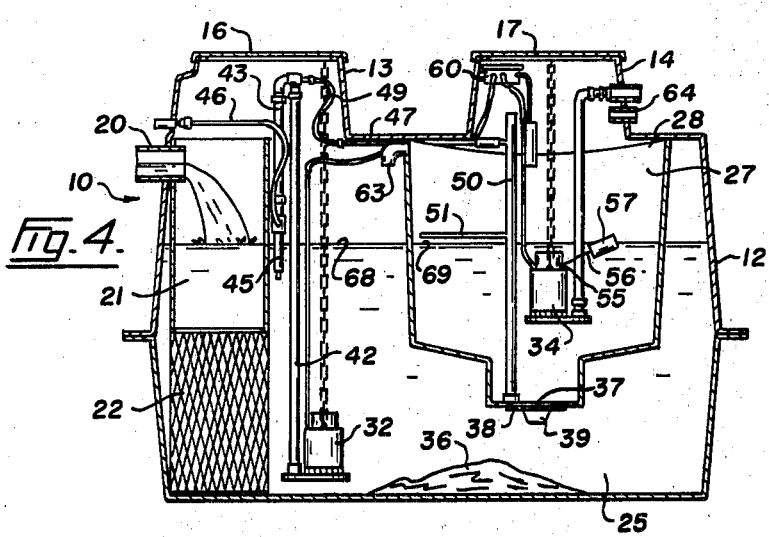
Figure 5:
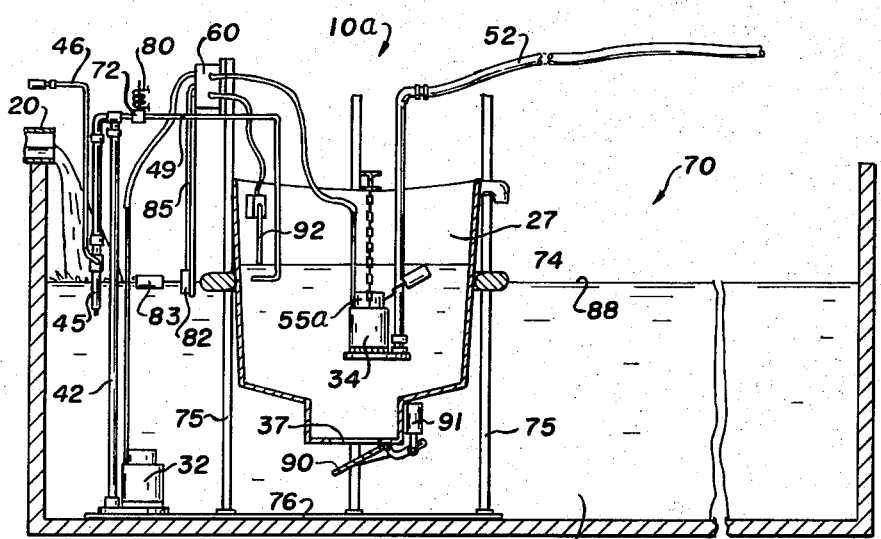
Figure 6:
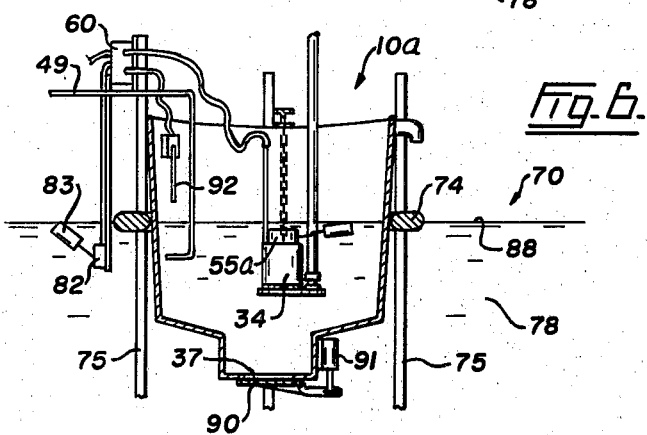
Figure 7:
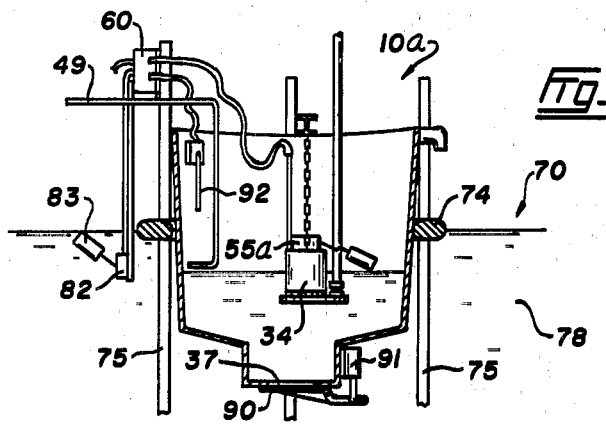

Examples of this invention are illustrated in the accompanying drawings, in which FIG. 1 is a perspective view of a preferred form of complete treatment apparatus, with parts of the wall thereof broken away to show the inner elements, FIG. 2 is a diagrammatic longitudinal and vertical sectional view through the apparatus of FIG. 1, illustrating one stage of the treatment process, FIGS. 3 and 4 are views similar to FIG. 1, but showing successive stages of the treatment process, and FIG. 5 is a diagrammatic sectional view similar to FIG. 2 illustrating an alternative form of the invention and with the operating elements of the system mounted in a large pond, and FIGS. 6 and 7 are diagrammatic views similar to FIG. 5, and illustrating successive stages of the treatment process in this embodiment.

Referring to FIGS. 1 to 4 of the drawings, 10 is one form of wastewater treatment apparatus in accordance with this invention. Apparatus 10 includes a tank 12 having two towers 13 and 14 projecting upwardly therefrom, said towers having covers 16 and 17 mounted thereon. These towers are provided for access to the interior of tank 10 for the insertion, removal and maintenance of the working elements therein.

Apparatus 10 includes an entrance pipe 20 which opens into a comminution chamber 21, the lower portion of which is in the form of a wire basket 22 so that all liquids entering the apparatus must pass through this basket. Tank 12 forms an aeration chamber 25 in which is mounted a fixed settling chamber 27, said settling chamber being mounted in this chamber beneath tower 14. Chamber 27 preferably has an open top 28. A suitable electrically driven pump 32 is mounted in aeration chamber 25 for pumping liquid therefrom into settling chamber 27, while another electricallydriven pump 34 is mounted in settling chamber 27 and is spaced above the bottom thereof. The bottom of the settling chamber is formed with a sump 36 which has an outlet 37 therein which, in this example, is controlled by a flap valve 38 having a float 39 connected thereto so as normally to keep the flap closed when there is liquid in the chamber 25.

Pump 32 draws liquid from aeration chamber 25 and directs it through an upwardly extending pipe 42 which is connected at its upper end to another pipe 43 extending down to an air nozzle assembly 45 of well-known construction. When liquid is pumped through this nozzle, it draws air through a pipe 46 into the apparatus from outside tank 12. This nozzle is directed downwardly towards basket 22 so that the liquid and air directed out of the nozzle helps to break up any solid material in the basket. The air is also directed into aeration chamber 25 in sufficient quantity to support the aerobic process taking place in the chamber.

A relatively small pipe 49 extends from the upper end of pipe 42 into settling chamber 27 to discharge liquid thereinto. In this example, pipe 47 is connected to a vertical pipe 50 standing in the settling chamber near the center thereof, and a branch pipe 51 projects horizontally from pipe 50 to discharge into the settling chamber. Pipe 49 can be made small enough to control the percentage of the liquid from pump 32 which is directed into settling chamber 27 relative to that directed to and through nozzle 45, or a control valve may be located in pipe 49 for this purpose.

A control switch 55 is mounted on pump 34 and is operated by an arm 56 having a float 57 on its outer end. A suitable set of electrical controls for this apparatus is mounted in control box 60. Switch 55 is actually a double switch and is connected in the electrical system of the apparatus so that pump 32 is started when arm 57 reaches the down position, and pump 34 is started after a predetermined period when said arm reaches the up position. Timing means in control box 60 is actuated by switch 55 when arm 57 reaches the up position, and this timing means is set to start pump 34 after the predetermined period.

Chamber 27 is provided with an overflow outlet 63 in case of failure of the control system, while tank 12 has an overflow 64 also in case the control system fails.

Flap valve 38 with float 39 stays closed when the level 68 of the liquid in aeration chamber 25 is the same as or above the level 69 of the liquid in settling chamber 27. However, when liquid level 69 rises above liquid level 68, hydrostatic pressure causes valve 38 to open automatically.

The operation of apparatus 10 is such that solids directed therein are broken down and remain therein until they mainly disappear in the aerobic process, while only supernatant liquid is pumped out of the apparatus. The operation of the apparatus is relatively simple, and is as follows:

Wastewater, such as sewage with solids therein, is directed into apparatus 10 through pipe 20. The liquid and solids are directed into the comminution chamber 21, and the solids remain therein until they are broken up sufficiently to pass through the wire basket 22. Pump 32 keeps circulating the liquid in aeration chamber 25 and causes air to be drawn into and through nozzle 45 to support the aerobic process in this chamber. At the same time, the recirculated air and water are directed towards the solids in basket 22 so that they help to break down these solids. A certain percentage of the outflow from pump 32, such as 25 percent, passes through pipe 49 and into settling chamber 47. Pump 34 is inoperative at this time, while valve 38 is closed. When the level of the liquid in chamber 27 rises above the level of the liquid in chamber 25, hydrostatic pressure causes flap valve 38 to open automatically so as to dump any solids in sump 36 back into the aeration chamber, while at the same time float 57 operates switch 55 to stop pump 32. When the level of the liquid in the settling chamber drops even with the level in the aeration chamber or below the latter level, because of open valve 38, the latter automatically shuts due to the buoyancy of float 39. After a suitable settling period, pump 34 is started to pump the supernatent liquid out of the settling chamber and out of tank 12 through pipe 52. When level 69 drops to a predetermined point, float 57 operates switch 55 to cause pump 32 to start the cycle over again.

The solids of the wastewater are broken up in comminution chamber 21 by abrasion against the walls of wire basket 29, and by the jet of water and air that is directed towards this basket by nozzle 45. The water and air from the nozzle keeps circulating the liquid in chamber 25 and provides the air for the aerobic process in this chamber. In chamber 27, any fine solids in the liquid therein are settled out into sump 34 and are periodically dumped back into the aeration chamber. This action continues until the solids disappear in the aerobic process. Supernatent liquid is pumped out of the apparatus from settling chamber 27. Pumps 32 and 34 are operated in sequence to direct liquid into the settling chamber and to remove supernatent liquid from said chamber, while flap valve 38 opens periodically and automatically to discharge settled sludge from sump 36 back into the aeration chamber.

FIGS. 2 to 4 illustrate the sequence of operation of treatment apparatus 10. In FIG. 2, pump 32 is just starting, pump 34 has just stopped, and valve 38 is closed. In FIG. 3, level 69 in chamber 27 is above level 68 in chamber 25 so that valve 38 has opened to discharge the sludge back into the aeration chamber. Pump 32 is stopped by float-operated switch 55. As soon as the levels 68 and 69 are the same, valve 38 closes, as shown in FIG. 4, and the apparatus stays this way for a predetermined settling period, for example, 45 minutes. Then pump 34 is started to pump supernatant liquid out of the settling chamber and out of tank 12. When the level 69 drops to a predetermined point, float operated switch 55 stops pump 34 and starts pump 32 to start this part of the cycle again, as in FIG. 2.

FIGS. 5, 6 and 7 illustrate apparatus 10a which instead of having a tank 12, is mounted in a large wastewater or sewage pond 70. In this example, the comminution chamber 21 usually is not required, since the liquid being directed into the pond has already been subjected to a preliminary treatment, in which the solids are broken down to a fine state. However, chamber 21 can be provided if necessary. Pump 32 directs liquid through pipe 42 to nozzle 45, and operates continuously to circulate liquid through the nozzle and to draw air into the system through pipe 46. In this case, pipe 49 has an electrically controlled valve 72 therein which is operated to allow liquid to be pumped into the settling chamber when desired. In this example, settling chamber 27 is provided with a buoyancy ring 74 near the top thereof so that the chamber floats in the liquid in pond 70. Vertical guide rods 75 project upwardly from a base 76 around chamber 27 to confine the latter to vertical movement only. The pond acts as an aeration chamber 78. Float-operated switch 55a is a single switch and is operated to stop pump 34 when the liquid in settling chamber 27 reaches a predetermined lower level, and to open valve 72. In this example, pump 34 is mounted on chamber 27 so as to move up and down with it.

Valve 72 is controlled by a solenoid 80 which, in turn, is connected to the electrical system of the apparatus which includes a switch 82 in chamber 78 operated by a float 83 when the liquid level in the pond rises to a predetermined level. Switch 82 is carried by a support 85 which extends downwardly from control box 60 mounted on the upper end of one of the guide rods 75. Switch 82 causes valve 72 to open when the liquid level 88 in aeration chamber 78 reaches the predetermined upper level.

A float-controlled float valve similar to valve 38 may be provided at the outlet 37 of chamber 27, or a hingedly mounted flap valve 90 may be provided for this purpose, said valve being operated in any desired manner, such as by means of a solenoid 91. Valve 90 is normally closed, and is opened when solenoid 91 is energized. An electrode 92 is mounted in and carried by the settling chamber and is positioned so that it is touched by the liquid in said chamber when it reaches a predetermined upper level. The lower end of electrode 92 is a little above the level of the liquid in the aeration chamber in which the settling chamber floats. This electrode is connected in the electrical system of the apparatus so that when the liquid in the settling chamber reaches the electrode, solenoid 91 is energized to open valve 90.

When the liquid level in settling chamber 27 drops to predetermined point, switch 55a stops pump 34 and opens valve 72 to permit liquid to be pumped from the aeration chamber into the settling chamber. Valve 90 is opened when the liquid in chamber 27 contacts the lower end of electrode 92, and the pumping continues as long as the level in chamber 27 is higher than that in chamber 78. When the liquid level in the aeration chamber rises to its predetermined upper level as a result of inflow from pipe 20, valve 72 is closed to stop the flow into the settling chamber, and as soon as the liquid leaves electrode 92, at which time it is substantially at the same level as the liquid in the aeration chamber, solenoid 91 is operated to close valve 90 and to start the timer in control box 60. After a predetermined settling period, pump 34 is operated to pump supernatent liquid out of the settling chamber through pipe 52 and away from pond 70. When the level of the liquid in the settling chamber drops to the predetermined low level, switch 55a stops pump 34 and opens valve 72 to start the cycle over again.

In apparatus 10a, pump 32 is normally in operation to stir up and aerate the liquid in aeration chamber 78. Valve 72 is normally open and liquid is pumped from chamber 78 into settling chamber 27. When the level of the liquid in chamber 27 is in contact with electrode 92 and above the level 88 of the liquid in the aeration chamber, valve 90 is open. Thus, aeration chamber liquid is normally being pumped through the settling chamber and the level in said chamber is kept above that in the aeration chamber. However, when the liquid in the aeration chamber reaches the predetermined upper level, float 83 operates switch 82 to energize solenoid 80 and close valve 72, thereby stopping the flow of liquid in the settling chamber. As soon as the settling chamber liquid clears electrode 92, because of open valve 90, solenoid 81 is energized to close this valve to start a settling period. After a predetermined time, pump 34 is started to pump supernatent liquid out of chamber 27 through pipe 52.

When the liquid in the settling chamber drops to a predetermined low level below the liquid level in the aeration chamber, switch 55a is operated to stop pump 34 and to open valve 72 to start the liquid flow into the settling chamber. Valve 90 is opened when the liquid in chamber 27 contacts electrode 92, and this results in the sludge accummulated in the settling chamber being dumped back into aeration chamber 78.

The above cycles are repeated until the liquid in aeration chamber 78 drops to a predetermined low level, at which time switch 82 is operated to prevent valve 72 from being opened and so no liquid is pumped into chamber 27 at this time. As soon as the liquid in chamber 78 rises to said low level, valve 72 is opened to allow liquid to be pumped into the settling chamber in the normal manner.

The functioning elements of the treatment apparatus 10a are such that they can be sold separately as a conversion unit before insertion into large tanks, ponds and the like.

I claim:

1. Aerobic wastewater treatment apparatus comprising a settling chamber adapted to be placed in an aeration chamber, an outlet controlled by a valve at the bottom of the settling chamber for periodically directing sludge out of said settling chamber into the aeration chamber, first means for directing liquid from the aeration chamber into the settling chamber, second means for directing supernatent liquid from the settling chamber out of the apparatus, control means for the first directing means and the second directing means to operate said first and second directing means sequentially to direct liquid from the aeration chamber into the settling chamber, and after a predetermined settling period, to direct supernatent liquid out of the settling chamber, and means for causing said valve to open and close said outlet.

2. Wastewater treatment apparatus as claimed in claim 1, in which said settling chamber including means for causing said settling chamber to float in the aeration chamber.

3. Wastewater treatment apparatus as claimed in claim 1 in which said first directing means comprises a first pump in the aeration chamber, and said second directing means comprises a second pump in the settling chamber.

4. Wastewater treatment apparatus as claimed in claim 1 in which said first directing means comprises a pump in the aeration chamber, and a control valve for selectively directing liquid from said pump into the settling chamber; and said control means for said pump comprises a switch operated by a float in the aeration chamber, said switch actuating the control valve when the liquid level in the aeration chamber rises above a predetermined upper level.

5. Wastewater treatment apparatus as claimed in claim 3 in which said control means for the second pump comprises switch means operated by a float in the settling chamber, said switch starting and stopping the second pump when the liquid level in the settling chamber rises above and drops below predetermined upper and lower levels respectively.

6. Wastewater treatment apparatus as claimed in claim 3 in which the settling chamber outlet is controlled by a buoyancy-controlled flap valve, said valve automatically opening when the liquid level in the settling chamber is above the liquid level in the aeration chamber, and automatically closing when the liquid level in the settling chamber is even with or lower than that in the settling chamber.

7. Wastewater treatment apparatus as claimed in claim 3 in which the settling chamber outlet is controlled by a hinged valve, electrically-operated means for moving the valve to open and close the outlet, and an electrode in the settling chamber for causing the valve to open when the liquid level in the settling chamber reaches the electrode.

8. Aerobic wastewater treatment apparatus, comprising a settling chamber adapted to be placed in an aeration chamber, first means for directing liquid from the aeration chamber into the settling chamber, operating means for discharging sludge from the settling chamber into the aeration chamber, means for stopping said first directing means when the liquid in the settling chamber reaches a predetermined upper level, second means for directing supernatent liquid from the settling chamber out of the apparatus, control means for starting said second directing means after a predetermined settling period to direct the supernatent liquid out of the settling chamber and the apparatus, means for starting said first directing means when the liquid in said settling chamber drops to a lower predetermined level, and means for starting and stopping said operating means.

9. Wastewater treatment apparatus as claimed in claim 8, in which said settling chamber including means for causing said settling chamber to float in the aeration chamber.

10. Aerobic wastewater treatment apparatus, comprising a settling chamber adapted to be placed in an aeration chamber, an outlet at the bottom of the settling chamber, a valve controlling said outlet, a first pump for directing liquid from the aeration chamber into the settling chamber, means for stopping the first pump when the liquid in the settling chamber reaches a predetermined upper level, a second pump in the settling chamber positioned to draw liquid from the latter chamber at a point spaced from the bottom thereof, control means for starting said second pump after a predetermined settling period to direct supernatent liquid out of the settling chamber and the apparatus, means for starting said first pump when the liquid in said settling chamber drops to a lower predetermined level, and means for opening and closing said valve when the level of the liquid in the settling chamber respectively rises above the level in the aeration chamber and drops to or below said last-mentioned level.

11. Wastewater treatment apparatus as claimed in claim 10 in which said valve is a buoyancy-controlled flap valve, said valve automatically opening when the liquid level in the settling chamber is above the liquid level in the aeration chamber, and automatically closing when the liquid level in the settling chamber is even with or lower than that in the aeration chamber.

12. Wastewater treatment apparatus as claimed in claim 10 in which said means for stopping and starting said first pump comprises a switch operated by a float in the liquid in the settling chamber, said switch stopping the first pump when the liquid in the settling chamber reaches the predetermined upper level and starting said first pump when the liquid in the settling chamber drops to the predetermined lower level.

13. Wastewater treatment apparatus as claimed in claim 10 in which said means for stopping and starting said first pump comprises a switch operated by a float in the liquid in the settling chamber, said switch stopping the first pump when the liquid in the settling chamber reaches the predetermined upper level and starting said first pump when the liquid in the settling chamber drops to the predetermined lower level; and said valve is a buoyancy-controlled flap valve, said valve automatically opening when the liquid level in the settling chamber is above the liquid level in the aeration chamber, and automatically closing when the liquid level in the settling chamber is even with or lower than that in the aeration chamber.

14. Wastewater treatment apparatus comprising a tank forming an aeration chamber, means for directing wastewater into the tank, means in the tank for comminuting solids in the wastewater, a settling chamber in the aeration chamber, an outlet at the bottom of the settling chamber, a valve controlling said outlet, a first pump for directing liquid from the aeration chamber into the settling chamber, means for directing air into the aeration chamber, means for stopping the first pump when the liquid in the settling chamber reaches a predetermined upper level, a second pump in the settling chamber positioned to draw liquid from the latter chamber at a point spaced from the bottom thereof, control means for starting said second pump after a predetermined settling period to direct supernatent liquid out of the settling chamber and the tank, means for starting said first pump when the liquid in said settling chamber drops to a lower predetermined level and means for opening and closing said valve when the level of the liquid in the settling chamber respectively rises above the level in the aeration chamber and drops to or below said last-mentioned level.

15. Wastewater treatment apparatus as claimed in claim 14 in which said valve is a buoyancy-controlled flap valve, said valve automatically opening when the liquid level in the settling chamber is above the liquid level in the aeration chamber, and automatically closing when the liquid level in the settling chamber is even with or lower than that in the aeration chamber.

16. Wastewater treatment apparatus as claimed in claim 14 in which said means for stopping and starting said first pump comprises a switch operated by a float in the liquid in the settling chamber, said switch stopping the first pump when the liquid in the settling chamber reaches the predetermined upper level and starting said first pump when the liquid in the settling chamber drops to the predetermined lower level.

17. Wastewater treatment apparatus as claimed in claim 14 in which said means for stopping and starting said first pump comprises a switch operated by a float in the liquid in the settling chamber, said switch stopping the first pump when the liquid in the settling chamber reaches the predetermined upper level and starting said first pump when the liquid in the settling chamber drops to the predetermined lower level; and said valve is a buoyancy-controlled flap valve, said valve automatically opening when the liquid level in the settling chamber is above the liquid level in the aeration chamber, and automatically closing when the liquid level in the settling chamber is even with or lower than that in the aeration chamber.

18. Wastewater treatment apparatus as claimed in claim 14 in which said comminuting means comprises a wire basket into which the wastewater entering the tank is directed.

19. Wastewater treatment apparatus as claimed in claim 14 in which the means for directing air into the aeration chamber comprises an air nozzle-venturi assembly, means connecting said assembly to the atmosphere outside the tank, and means connecting the first pump to said assembly, whereby said first pump directs some liquid through the assembly and back into the aeration chamber to suck air into the latter chamber, and simultaneously directs a comparatively small amount of liquid into the settling chamber.

* * * * *